April 9, 1929. H. HOFFMAN ET AL 1,708,921
KITCHEN UTENSIL
Filed Aug. 1, 1928
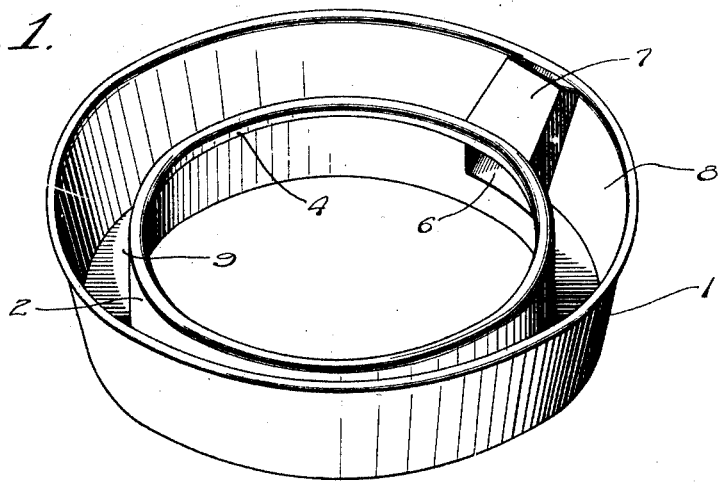
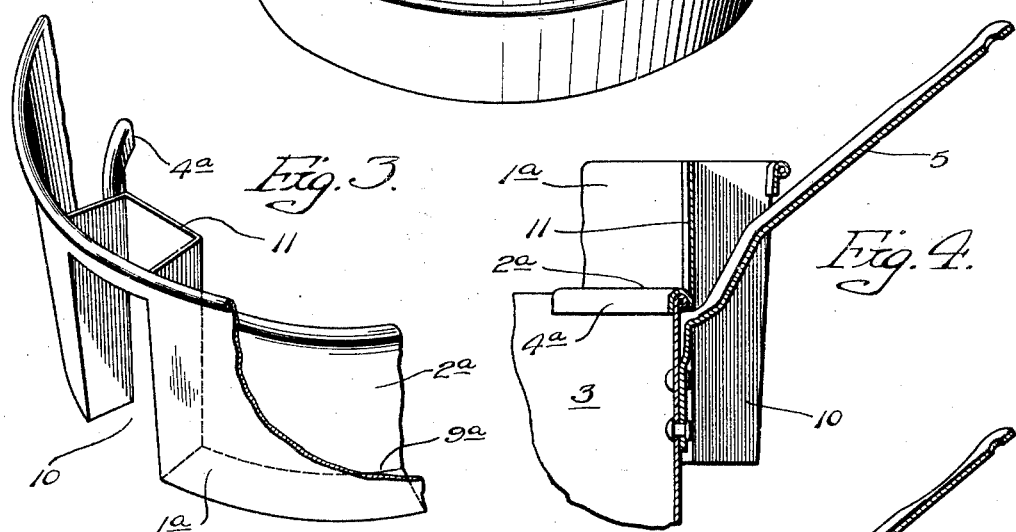
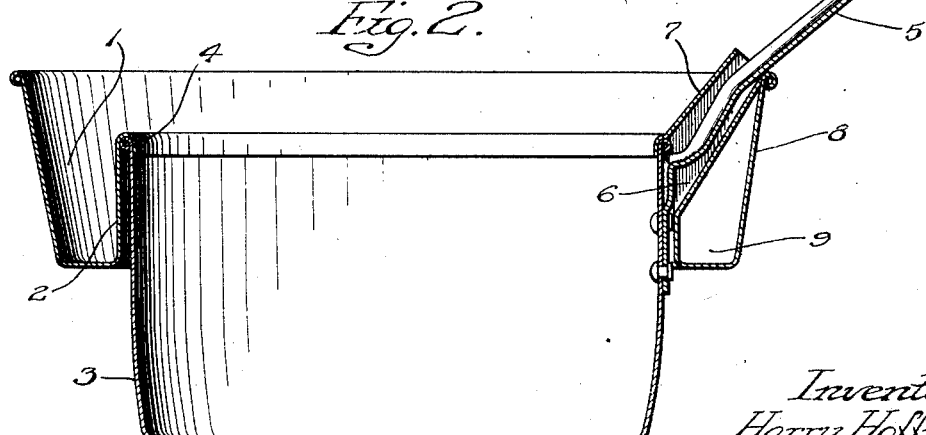
Inventors
Harry Hoffman
Louis Hoffman
by their Attorneys
Howson & Howson Patented Apr. 9, 1929.

1,708,921

UNITED STATES PATENT OFFICE.

HARRY HOFFMAN AND LOUIS HOFFMAN, OF PHILADELPHIA, PENNSYLVANIA.

KITCHEN UTENSIL.

Application filed August 1, 1928. Serial No. 296,747.

This invention relates to improvements in kitchen utensils, and relates more particularly to improvements in devices for preventing the overflow from kettles, sauce pans and the like from flowing down upon the burners or stove surfaces.

More specifically, the invention contemplates provision of means readily attachable and detachable from a sauce pan or the like for catching the overflow due to excessive boiling and preventing said overflow from falling on the stove surfaces.

A still further object of the invention is to provide a device of the stated character having provision for attachment to sauce pans and the like having handles.

The invention also resides in certain novel and ingenious structural details, as hereinafter set forth and as illustrated in the attached drawings, in which:

Figure 1 is a view in perspective of a device made in accordance with our invention;

Fig. 2 is a transverse sectional view illustrating the device applied to a sauce pan;

Fig. 3 is a view in perspective of a modified form of attachment, and

Fig. 4 is a fragmentary sectional view similar to that of Fig. 3 illustrating the attachment in its application to a sauce pan.

Cooking utensils have been made including an integral gutter formation extending around the outside and at the upper edge of the utensil to catch overflow due to excessive boiling. It has also been suggested that this gutter take the form of an attachment applicable to different types of pan of a given size. The utility of such devices has been restricted, however, to utensils of a type lacking handles, and the utility of the device accordingly has been materially restricted. We have devised an article of this general character in the form of an attachment in which provision is made for so receiving the handle of the utensil as to permit the ready application of the device to utensils of the handle type, the device being equally applicable to utensils lacking handles.

With reference to Fig. 1 of the drawings, in which we have illustrated a preferred form of our device, 1 indicates an annular channel or trough-shaped element, the inner wall 2 of which is adapted to fit with substantial neatness around the upper portion of a sauce pan or similar kitchen utensil after the manner shown in Fig. 2, in which the utensil is indicated by the reference numeral 3. The upper edge of the inner wall 2 of the attachment preferably is beaded over, as indicated at 4 in Fig. 2, so as to hook over or embrace the upper edge of the pan 2 to thereby assist in supporting the member 1 on the utensil, but primarily to effectively seal the joint between the upper edge of the utensil wall and the inner wall 2 of the attachment.

As shown in Fig. 2, the pan 3, which is of a universally used and well known type, is provided with a handle 5 which projects upwardly and away from the side wall of the utensil. In order to provide a completely annular trough member extending continuously and without interruption around the utensil, it is necessary to make provision for the handle 5, and in the present instance, we have provided in the inner wall 2 of the annular trough member an aperture 6, and extending upwardly and outwardly from said aperture at an inclination corresponding substantially to the inclination of the handle 5 with respect to the body of the receptacle, a sleeve 7 which at its outer lower edge attaches to the upper edge of the outer wall 8 of the attachment. In assembly, the handle 5 projects, as shown in Fig. 2, through this sleeve 7, which accordingly permits the continuous annular bead 4 at the upper edge of the inner wall of the trough member 1 to fit down upon the upper edge of the pan 3 around the entire circumference of the latter. It will further be noted that the sleeve 7, while acting as a baffle wall to prevent the overflow from entering the aperture 6, is so formed as not to obstruct the bottom of the trough 9 at any point, so that the latter extends continuously around the receptacle. This is an advantage, in that when the utensil is tipped in any direction, the liquid which has overflowed into the trough 9 from the pan 3 will flow uninterruptedly to the lowest part of the trough, which makes the operation of pouring off this liquid a relatively simple one.

While the construction described above is preferred, the advantages of the invention may be realized in some degree by a construction as illustrated in Figs. 3 and 4. In this instance, the channel or trough member 1ª is essentially the same as the member 1, with the exception that the channel 9ª is interrupted at one point to form an opening 10 through which the handle 5 of the pan may pass, as shown in Fig. 4. The opening 10, which is in the inner wall 2ª of the member 1ᵃ stops short of the turned-in or beaded-over upper edge, has at its upper end a baffle wall 11 which prevents the overflow from passing into the aperture 10 and deflects it to each side of the opening 10 into the channel 9ᵃ. This form of the device while having certain advantages of manufacture and while affording an attachment which functions in all essential respects in the same manner as the member 1 described above lacks the continuity of the channel 9 of the latter member, which renders the operation of pouring off the liquid from the pan and from the attachment slightly more complicated by reason of the necessity for keeping the utensil away from the handle so that the liquid may flow from both sides of the channel 9ᵃ to the point of discharge.

The foregoing device when properly constructed forms an attachment which is extremely effective in operation, is readily applied to pans or other utensils having handles, and unites with said pan to form an overflow-receiving channel which has the appearance and advantages of an integral part of the utensil to which it may be attached.

Obviously, there may be other modifications without departure from the invention.

We claim:

1. An overflow receiving device for utensils comprising an annular channel-shaped member the inner wall of which is adapted to embrace the wall of the said utensil and has a beaded-over upper edge which embraces the upper edge of the utensil, and a passage in one side of said trough member adapted for reception of a handle projecting from the utensil.

2. An overflow receiving device for kitchen utensils comprising a substantially annular trough-shaped member adapted to fit around said utensil and having an opening at one side for reception of a handle projecting from said utensil, and a baffle wall surrounding at least a portion of said opening and adapted to prevent passage of fluid into the said handle opening.

3. A device for receiving the overflow from kitchen utensils and the like, which comprises an annular trough-shaped member adapted to fit around the said utensil, said member having its inner wall apertured, a sleeve projecting upwardly and outwardly from said aperture and having its upper portion secured to the outer wall of said member so as to bridge the said trough and to leave the bottom thereof unobstructed.

HARRY HOFFMAN.
LOUIS HOFFMAN.